Dec. 8, 1959      R. BRUSCAGLIONI      2,915,826
DEVICE FOR MOUNTING GRADUATED CIRCLES OF THEODOLITES
Filed Oct. 14, 1955      2 Sheets-Sheet 1

INVENTOR.
Raffaello Bruscaglioni
BY
Attorney

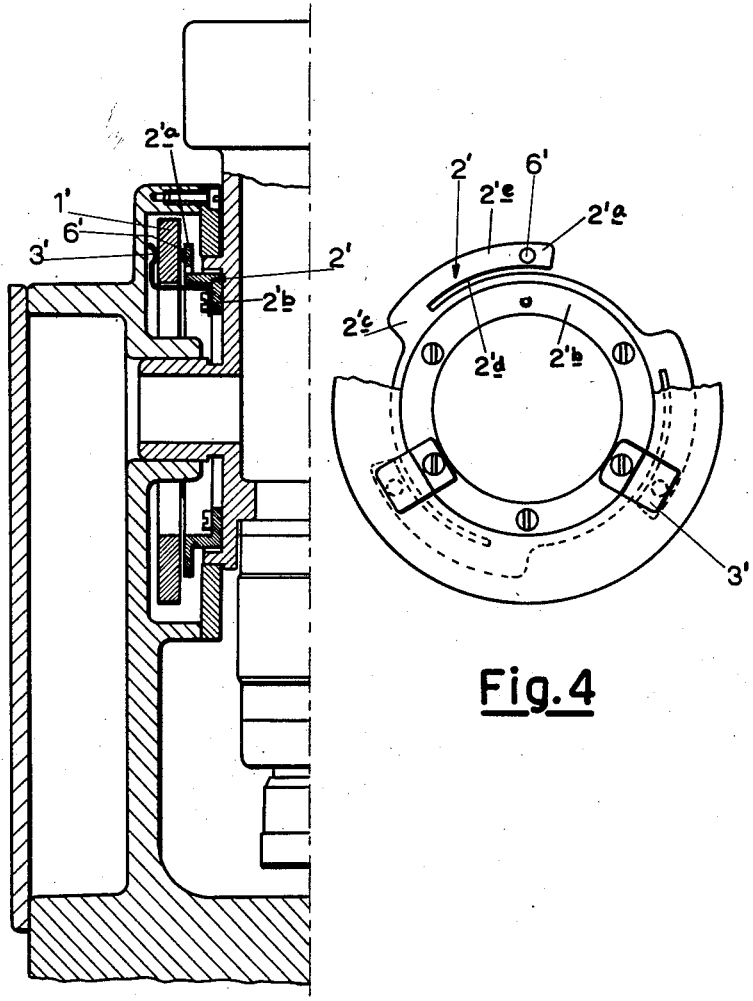

United States Patent Office 2,915,826
Patented Dec. 8, 1959

2,915,826

DEVICE FOR MOUNTING GRADUATED CIRCLES OF THEODOLITES

Raffaello Bruscaglioni, Milan, Italy, assignor to Filotecnica Salmoiraghi S.p.A., Milan, Italy, an Italian company Application October 14, 1955, Serial No. 540,598

Claims priority, application Italy October 14, 1954

3 Claims. (Cl. 33—46)

This invention relates to devices for mounting graduated circles of theodolites, and has for its object to facilitate centering of the graduated circles and to ensure the safe mounting thereof.

It is known that, in the construction of theodolites, it is essential to maintain the centering of the graduated circles within very narrow limits. The mechanical difficulties encountered in rendering the rotation of the theodolite on the baseplate coaxial with the rotation of the graduated circle with respect to the baseplate are known, especially in those theodolites in which the graduated circle must be independently movable.

It is also known that, in practice, theodolites undergo severe vibrations during shipping and are subjected to noticeable temperature variations due to changes of climate, e.g. from the climate encountered in tropical zones to the climate in high mountains. Such temperature change may create noticeable stresses between the glass circles and the metal parts of the theodolite.

The simultaneous action of such internal stresses and of the vibrations undergone during shipping may cause relative movements of the circle with respect to its mounting of such magnitude as to impair the precision of the instrument.

It is a specific object of the present invention to provide a mechanical device facilitating the attainment of the coaxiality of the graduated circles with the alidade of the theodolite.

Another object of the invention is to fix the graduated circles with respect to their mountings so as to reduce the stressing thereof due to temperature changes.

A further object is to reduce the stressing of the glass graduated circle due to the accelerations caused by vibrations and to ensure the accurate centering of the circle without requiring excessive pressure between the circle and its mounting.

In accordance with the invention, both the circle-carrier and the alidade of the theodolite are mounted on a single ground pin, and the circle carrier includes a ring provided with arms which are formed so as to permit ample elastic displacements thereof capable of absorbing vibrations and the differences in expansion due to temperature changes.

Embodiments of the invention are shown, by way of example only, in the accompanying drawings, wherein:

Fig. 3 is a sectional view of a device for mounting a vertical circle.

Fig. 4 is a detail showing how the circle of Fig. 3 is fixed to its carrier.

Figure 1:
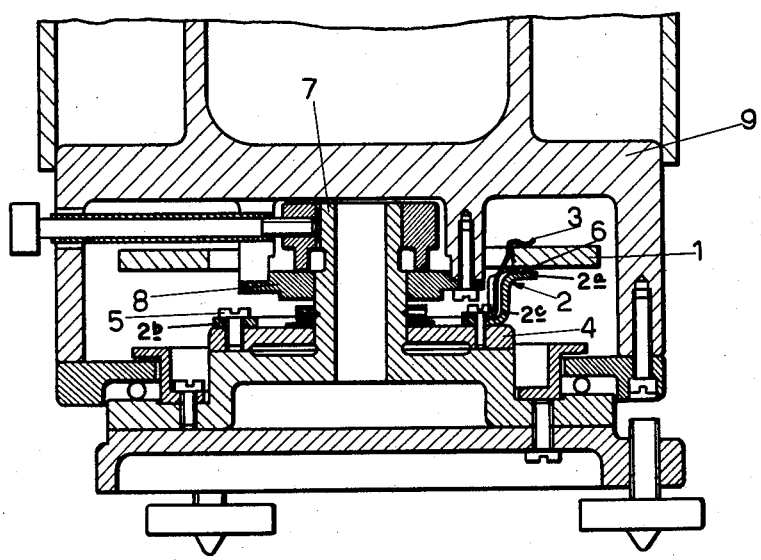
Fig. 1 is a sectional view of a device for mounting a horizontal circle.
Figure 2:
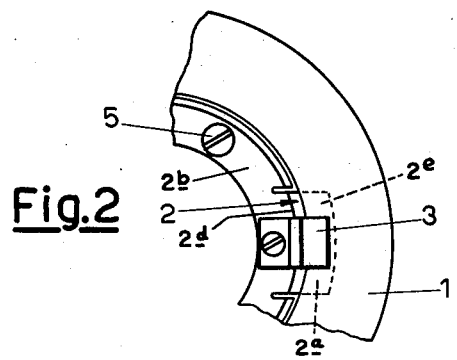
Fig. 2 is a detail showing how the circle of Fig. 1 is fixed to its carrier.
Figure 2:

Referring to Figs. 1 and 2, it will be seen that in the device there illustrated, the graduated circle 1 rests upon three points 6 which are spaced 120° apart and is held against such points 6 by the pressure of three leaf-springs 3. These three support points 6, in practice, are small plane or spherical surfaces protruding from the three elastic arms 2a of the circle-carrier which is generally identified by the reference numeral 2.

The circle-carrier 2 is formed of suitably stamped and bent sheet metal and further includes a ring portion 2b, with resilient leg portions 2c being integrally joined to the ring portion at equally angularly spaced apart locations and being also integrally joined to the arms 2a. The arms 2a normally lie in a plane which is perpendicular or normal to the central axis of ring portion 2b, and such arms have arcuate radially inner and outer edges 2d and 2e, respectively, which are concentric with the central axis of the ring portion 2b.

In the circle-carrier 2 of Figs. 1 and 2, the leg portions 2c extend axially from the ring portion 2b, that is, upwardly from the horizontal plane of the latter, and such leg portions are joined to the arms or arm portions 2a along the radially inner edges 2d of the latter so that the arms 2a extend radially outward from the leg portions 2c and can deflect radially with respect to ring portion 2b and also in the direction of the axis of the latter. Thus, the arms 2a of carrier 2 permit the radial deformation caused by the temperature changes and are capable of absorbing the accelerations due to shocks and vibrations to which the instrument is subjected.

To secure a satisfactory fixing of the circle 1 to the three support points 6, a suitable putty is introduced between the leaf-springs 3, the circle and the arm 2a of the circle-carrier 2.

The difference in expansion between the glass circle 1 and the metal carrier 2, while the points 6 to which the circle is fixed remain stationary on the latter, causes the flexing of the upwardly directed leg portions 2c of the circle carrier 2, thus avoiding any sliding movement between the circle and the circle carrier and consequently any possible eccentric movement with respect to the axis of rotation.

The ring portion 2b of circle-carrier 2 is secured, by screws 5, to a rotatable platform 4 mounted on a pin 7. Pin 7 also defines the main axis of the theodolite and the alidade 9 of the theodolite is centered with respect to pin 7 by a bushing 8 rotatable on pin 7 and affixed to the central part of the alidade. Thus, pin 7 defines a common rotation axis for the alidade and the graduated circle and, by this expedient the risk of eccentricity, due to the connecting together of several pieces, as in conventional theodolites, is overcome.

Referring now to Figs. 3 and 4, it will be seen that the graduated circle 1' there illustrated is rotatable in a vertical plane, as distinguished from the circle 1 of the first described embodiment, which is rotatable in a horizontal plane. The mounting for the circle 1' of Figs. 3 and 4 also includes a stamped metal carrier 2' including, as integral parts thereof, a ring portion 2'b, leg portions 2'c extending from ring portion 2'b at three equally angularly spaced apart locations and arm portions 2'a extending from leg portions 2'c and having protrusions or support points 6' against which circle 1' is held by leaf-springs 3'.

In the carrier 2' of Figs. 3 and 4, the leg portions 2'c extend radially outward from the edge of an axially directed flange of ring portion 2'b and lie in the vertical plane of the arm portions 2'a, and the radially inner edge 2'd of each arm portion is substantially free of the ring portion 2'b (Fig. 4). Further, the arm portions 2'a extend circumferentially in the same direction, that is, in the clock-wise direction, as viewed in Fig. 4, from the related leg portions 2'c, so that the free ends of arm portions 2'a can deflect radially toward and away from the center of ring portion 2'b while remaining in the normally vertical plane of the arm portions. The free ends of arm portions 2'a can also deflect out of the normally vertical plane of the arm portions, that is, in directions parallel to the central axis of ring portion 2'b.

Thus, the arm portions 2'a of carrier 2' also accommodate the difference in expansion rates of glass circle 1' and metal carrier 2' and serve to absorb impacts and vibrations to avoid damage to circle 1'.

Although illustrative embodiments of the invention have been described in detail herein with reference to the accompanying drawings, it is to be understood that the invention is not limited to such precise embodiments and that various changes and modifications can be effected therein without departing from the scope or spirit of the invention, except as defined in the appended claims.

What I claim is:

1. A device for mounting the graduated circle of a theodolite and the like; comprising a carrier having a ring portion, leg portions joined resiliently to said ring portion at equally angularly spaced apart locations and arm portions projecting from said leg portions and normally lying in a plane normal to the central axis of said ring portion, each of said arm portions having arcuate radially inner and outer edges concentric with said axis of the ring portion and an integral bearing surface thereon adjacent the free end of the related arm portion to support the graduated circle, and leaf springs secured to said ring portion and extending radially over said arm portions to hold the graduated circle against the bearing surfaces of said arm portions.

2. A device as in claim 1; wherein said leg portions extend axially from said ring portion at said locations and are joined to said arm portions along said radially inner edges of the latter so that said arm portions extend radially outward from said legs and can deflect radially with respect to said ring portion and also in the direction of said axis of the latter.

3. A device as in claim 1; wherein said leg portions extend radially outward from said ring portion in said plane in which the arm portions normally lie; and wherein said arm portions extend circumferentially, in the same direction, from the related leg portions and have their radially inner edges free of said ring portion so that the ends of said arm portions remote from said leg portions can deflect radially in said plane in which they normally lie as well as out of said plane in the direction of said axis of the ring portion.

References Cited in the file of this patent

UNITED STATES PATENTS

| 2,640,267 | Geier | June 2, 1953 |
| 2,647,320 | Keuffel et al. | Aug. 4, 1953 |

FOREIGN PATENTS

| 518,148 | Great Britain | Feb. 19, 1940 |
| 548,512 | Great Britain | Oct. 13, 1942 |